(12) United States Patent
Nordstrom

(10) Patent No.: US 6,668,880 B2
(45) Date of Patent: Dec. 30, 2003

(54) AUXILIARY POWERED FOREST CLEARING IMPLEMENT

(76) Inventor: C. Richard Nordstrom, 404 Klette Rd., Kingston, ID (US) 83839

(*) Notice: Subject to any disclaimer, the term of this patent is extended or adjusted under 35 U.S.C. 154(b) by 39 days.

(21) Appl. No.: 09/861,287

(22) Filed: May 18, 2001

(65) Prior Publication Data

US 2002/0170623 A1 Nov. 21, 2002

(51) Int. Cl.[7] .............................................. A01G 23/08
(52) U.S. Cl. ...................................... 144/4.1; 144/34.1
(58) Field of Search ................................. 144/4.1, 34.1, 144/336, 335; 414/688, 729

(56) References Cited

U.S. PATENT DOCUMENTS

| | | | | |
|---|---|---|---|---|
| 3,915,209 A | * | 10/1975 | Denis | ................... 144/222 |
| 4,769,977 A | * | 9/1988 | Milbourn | .................. 144/34.1 |
| 5,979,518 A | * | 11/1999 | Hamby | ........................ 144/335 |
| 6,136,175 A | * | 10/2000 | Stelzl et al. | ................ 205/220 |

* cited by examiner

Primary Examiner—Allen Ostrager
Assistant Examiner—Shelley Self
(74) Attorney, Agent, or Firm—Randy A. Gregory

(57) ABSTRACT

An implement for clearing brush and trees which includes a self-propelled vehicle and at least one boom mounted upon the vehicle. The boom is constructed for articulated motion of a distal end thereof. A cutting disk is operatively mounted for rotation to the distal end of said boom to cut brush and trees when rotated. A secondary power source is supported on the self-propelled vehicle and used to primarily power the cutting disk. The implement is configured to allow field replacement of a cutting wheel support cartridge.

7 Claims, 9 Drawing Sheets

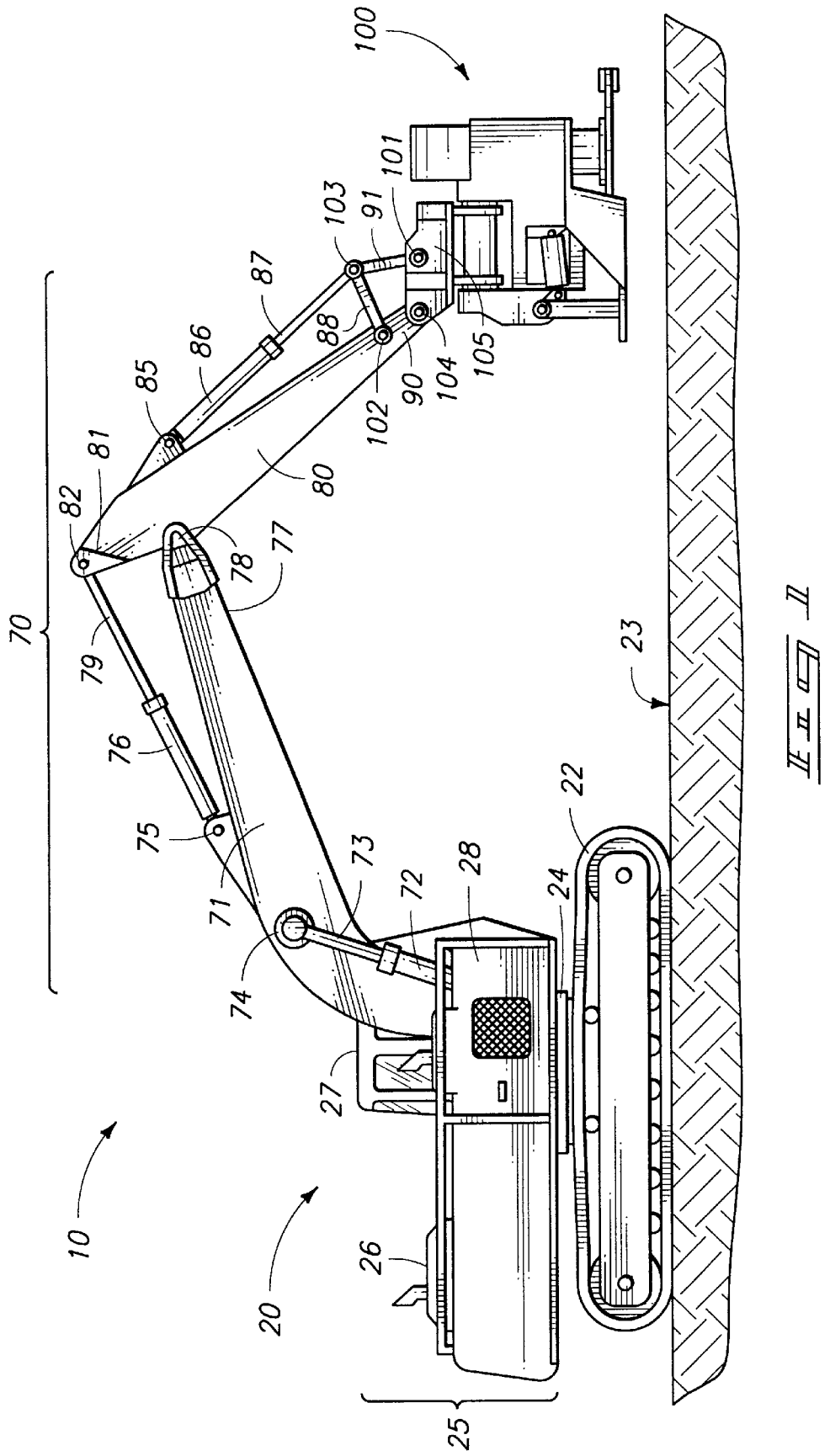

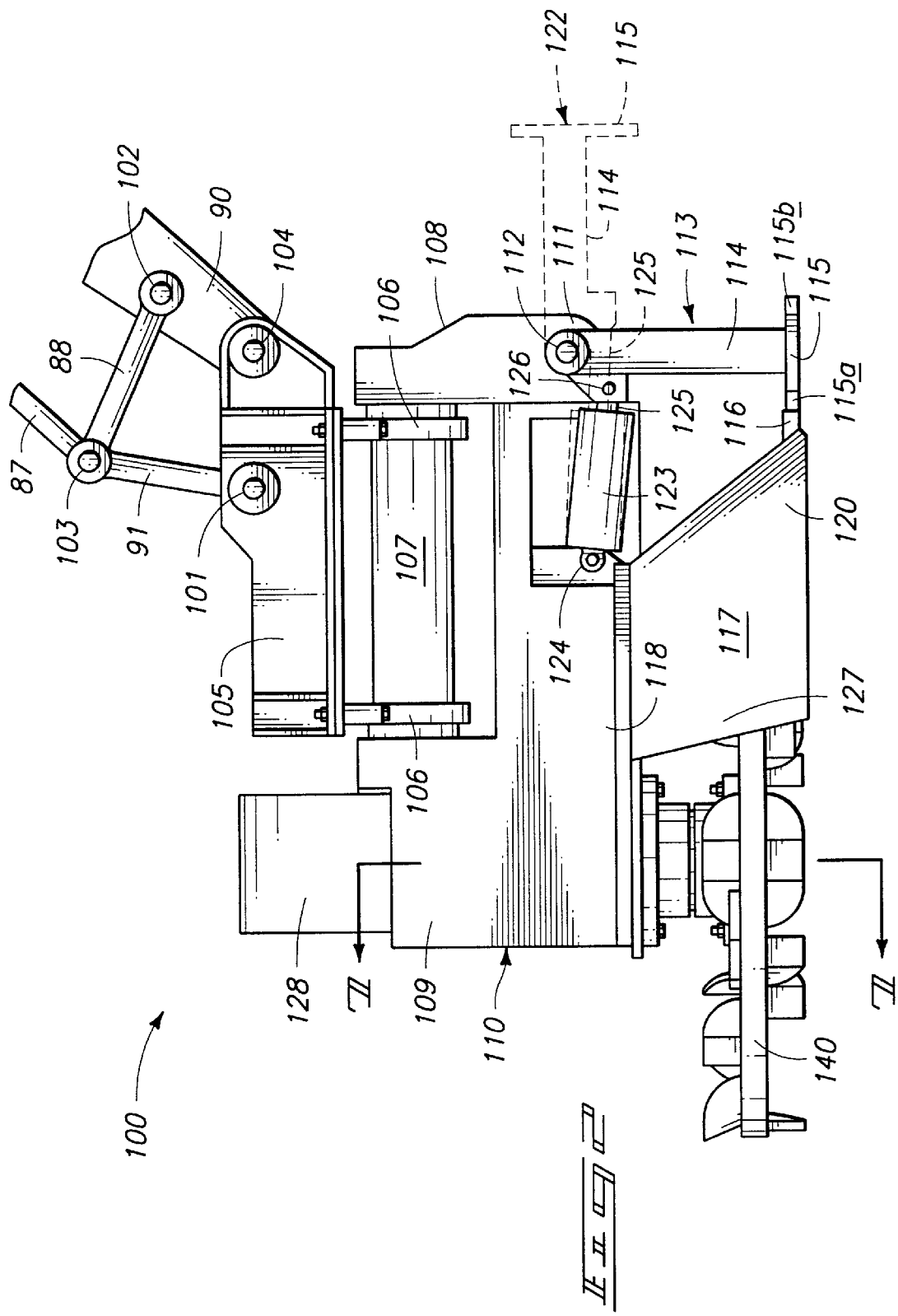

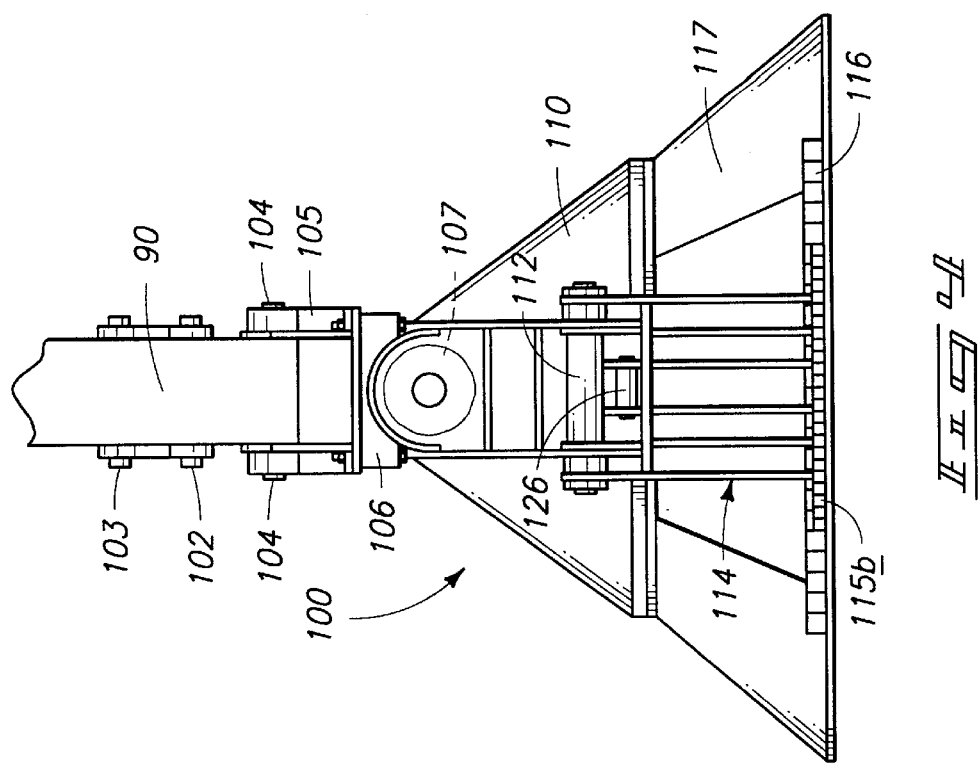
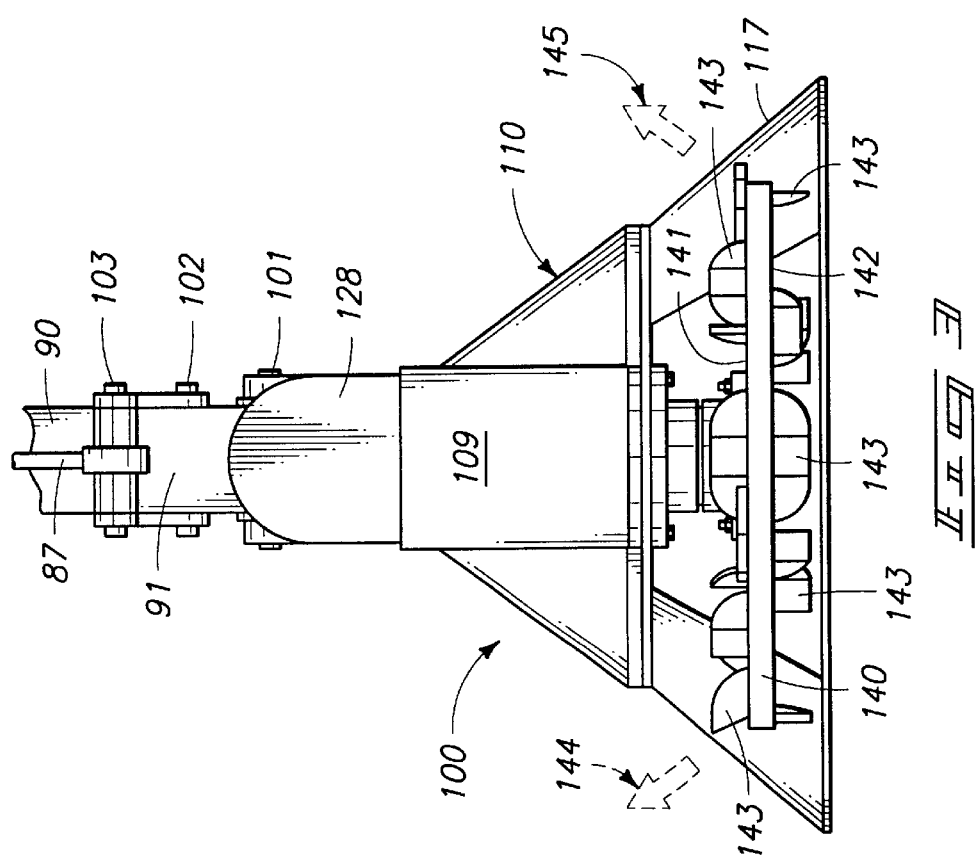

AUXILIARY POWERED FOREST CLEARING IMPLEMENT

TECHNICAL FILED

The technical field of this invention is implements for clearing vegetative growth, and particularly, implements for clearing dense vegetative growth such as brush and trees in forests to build and maintain around dwellings and roadways, and within utility and other various right-of-ways or easements.

BACKGROUND OF THE INVENTION

The public continues to expand the boundaries in which to live by moving into remote areas of the country with dense vegetation such as forest or woodlands. The demand to make such remote areas inhabitable requires clearing the vegetation to allow access for heavy equipment, and to build new dwellings, roadways, and right-of-ways. Moreover, existing roadways and right-of-ways have shoulders, banks and drainage ditches which need periodic grooming.

Implements for clearing and grooming such vegetation have been developed utilizing a self-propelled vehicle, such as an excavator backhoe having a boom apparatus. The boom is pivotally attached to the excavator turret. The boom apparatus has a distal end with a cutting apparatus attached thereto for cutting and clearing vegetation. The excavator is advantageously track driven to facilitate transport of the cutting apparatus to remote locations. The pivoting turret and boom apparatus provide the cutting apparatus at selective cutting elevations relative to the ground.

To effectively clear such vegetation, an exemplary implement for clearing and grooming must be capable of providing enough power to the cutting apparatus to sever varying diameters of trees and brush. Such power produces detrimental forces to components of the cutting apparatus. These require routine maintenance, repairs and sometimes major overhauls. However, exemplary implements for clearing and grooming are not designed for repairs or overhauls in the field, and are therefore, transported to a repair shop. If the implement for clearing and grooming is working at an operation site several miles from an access road, then considerable time is wasted transporting the excavator across rough terrain. Additionally, the transport truck must also travel to the shop after the excavator.

In view of the foregoing, it is desirable to provide an implement for clearing and grooming configured to provide continued operation and capable of maintenance by operators in the field.

BRIEF DESCRIPTION OF THE DRAWINGS

Preferred embodiments of the invention are described below with reference to the accompanying drawings, which are briefly described below.

FIG. 1 is a side elevational view illustrating an implement for clearing and grooming according to one preferred embodiment of the present invention.

FIG. 2 is a fragmented side elevational view of a distal end of a boom and cutting head according to such embodiment of the present invention.

FIG. 3 is a front elevational view as viewed from the front in FIG. 2.

FIG. 4 is a rear elevational view as viewed from the rear in FIG. 2.

DETAILED DESCRIPTION OF THE PREFERRED EMBODIMENTS

Vehicle Generally

Figure 5:
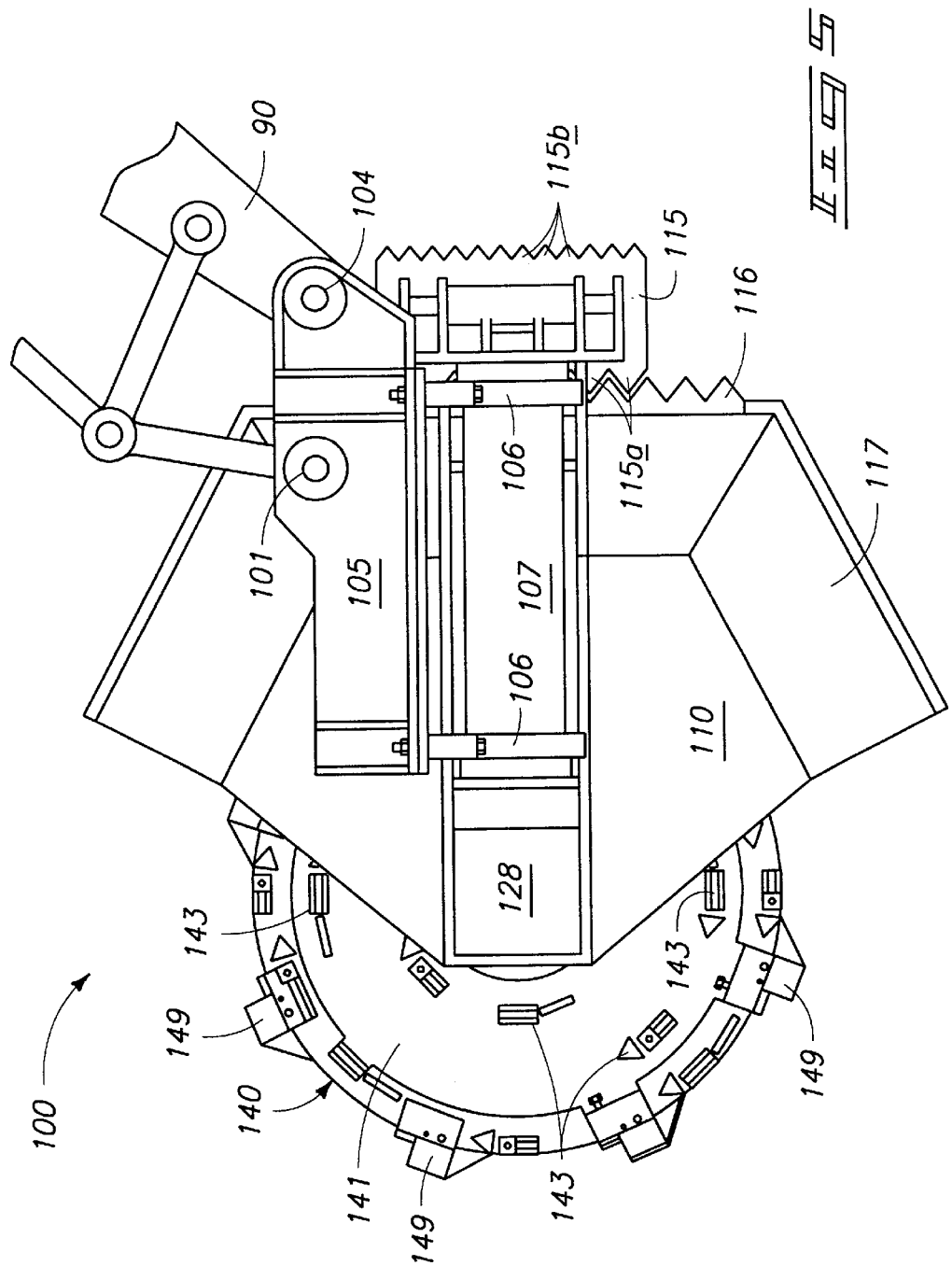
FIG. 5 is the cutting head of FIG. 2 with the cutting head swivelled.

A preferred embodiment according to the present invention is generally shown by the reference numeral 10 in the accompanying drawings. Referring to FIG. 1, implement 10 is adapted for clearing and grooming vegetation, such as brush and trees. It includes a self-propelled vehicle 20 and a boom apparatus 70 pivotally mounted to the self-propelled vehicle 20. The boom apparatus has a distal end 90 and a cutting head 100 secured to the distal end 90 of boom apparatus 70. An exemplary self-propelled vehicle 20 may be a 40 ton excavator. It should be understood that an exemplary self-propelled vehicle 20 could include a variety of vehicles adapted for crossing rough terrain found in remote areas. Furthermore, the exemplary self-propelled vehicle 20 is preferably capable of traversing terrain having slopes of 50 to 60% relative to horizontal ground 23.

Vehicle Carriage

The vehicle 20 of FIG. 1 includes endless belt or track type ground contact drives having treads 22 for carrying vehicle 20 over all types of terrain. A turntable or turret swivel mechanism 24 is mounted on the excavator carriage in swivelling relation relative to the treads 22 and other parts of the carriage. A turret 25 is mounted on the carriage using swivel mechanism 24 such that the turret 25 is capable of swivelling relative to the treads 22 about a swivel axis generally perpendicular to the terrain 23.

Primary Engine

A main, or primary engine 26 provides power to at least treads 22 to move vehicle 20 across terrain 23. Moreover, an exemplary primary engine 26 provides power to swivel mechanism 24 to swivel turret 25. Primary engine 26 is mounted, for example, on a rear portion of turret 25. A cab 27 is mounted on a front portion of the turret 25, for example, in front of primary engine 26 to one side of the turret 25. The cab 27 is designed to house an operator and includes controls and instrumentation for operating clearing implement 10.

Secondary Engine

A secondary power source, for example an auxiliary engine 28 (described more thoroughly below), is mounted to the turret 25 at the front portion on a side opposite cab 27. Further mounted to the front portion of turret 25 between cab 27 and auxiliary engine 28 is boom apparatus 70. It should be understood that cab 27, primary engine 26 and auxiliary engine 28 could be positioned on turret 25 in other configurations with the previously described orientation only presented as a preferred configuration.

Boom Apparatus

The boom apparatus 70 includes at least one boom, with the embodiment shown including a first boom 71 and a second boom 80. It should be understood that three or more booms could make up boom apparatus 70 and would be configured as subsequently described for first and second booms 71 and 80. The first boom 71 has a known bent configuration that ensures that the second boom 80 clears the vehicle 20 when the first boom 71 is in a vertical position. First boom 71 has a proximal end (not shown) that is pivotally attached to the turret 25 of vehicle 20 as is understood in the industry, and a distal end 77.

Boom and Boom Operation

A system for pivoting the boom apparatus 70 includes a hydraulic system which is not shown, but is conventional in the industry. The hydraulic system operates boom apparatus 70 preferably using primary engine 26. The boom apparatus 70 pivots between a position in which it extends generally vertical upward from the turret 25, and in a position in which it extends generally horizontally outwardly from the turret 25. A pair of hydraulic cylinders 72 (only one shown with the other generally aligned with the one shown on the opposite side of first boom 71 as understood in the industry) are pivotally attached to the turret 25 and the first boom 71 to pivot the first boom 71 between its vertical and horizontal positions. Each cylinder 72 has a piston 73 that slidingly extends therefrom and is pivotally attached to the first boom 71 at attachment point, or pivot point 74 located near the bend in the first boom 71. Additional references to pivot points are made subsequently, and include configurations as is understood in the industry, and therefore, are not more thoroughly described.

Distal end 77 of first boom 71 is pivotally attached to second boom 80 at a pivot point 78 which is spaced from a proximal end 81 of second boom 80. A hydraulic cylinder 76 is pivotally secured to an upper surface of the first boom 71, outwardly of pivot point 74, at a pivot point 75. The hydraulic cylinder 76 has a piston 79 which slidingly extends therefrom and is pivotally attached to pivot point 82 located at the proximal end 81 of second boom 80. Cylinder 76 is operatively connected to the hydraulic hose system of clearing implement 10 to pivot the second boom 80 relative to the first boom 71 about pivot point 78.

Second boom 80 includes a distal end 90 opposite proximal end 81 and a hydraulic cylinder 86 pivotally mounted to an upper surface of second boom 80 at a pivot point 85. A piston 87 slidingly extends outwardly from cylinder 86 and pivotally engages a linear link pair 88 (only one link of the pair shown with the other link pivotally connected on the opposite side of second boom 80) at a pivot point 103. Ends of linear link pair 88 opposite pivot point 103 are pivotally connected to second boom 80 at a pivot point 102 located a spaced distance from distal end 90 of second boom 80. A link plate 91 is pivotally connected at pivot point 103 to linear link pair 88 and piston 87. It should be understood that link plate 91 could have a one piece link configuration or designed as two links similar to linear link pair 88. An end of link plate 91 opposite pivot point 103 is pivotally connected to an actuator mounting plate 105 at a pivot point 101 spaced a distance from the distal end 90 of second boom 80.

Rearward of pivot point 101, a rear portion of actuator mounting plate 105 is pivotally connected to the distal end 90 of second boom 80 at a pivot point 104 such that actuator mounting plate 105 extends outwardly from pivot point 104. Linear link pair 88 and plate link 91 are configured with pivot points 101, 102, 103 and 104 such that actuation of piston 87 by hydraulic cylinder 86 drives actuator mounting plate 105 to selectively pivot same relative second boom 80 about pivot point 104. Hydraulic cylinder 86 is operatively connected to primary engine 26 via the hydraulic hose system.

Cutting Head

Figure 6:
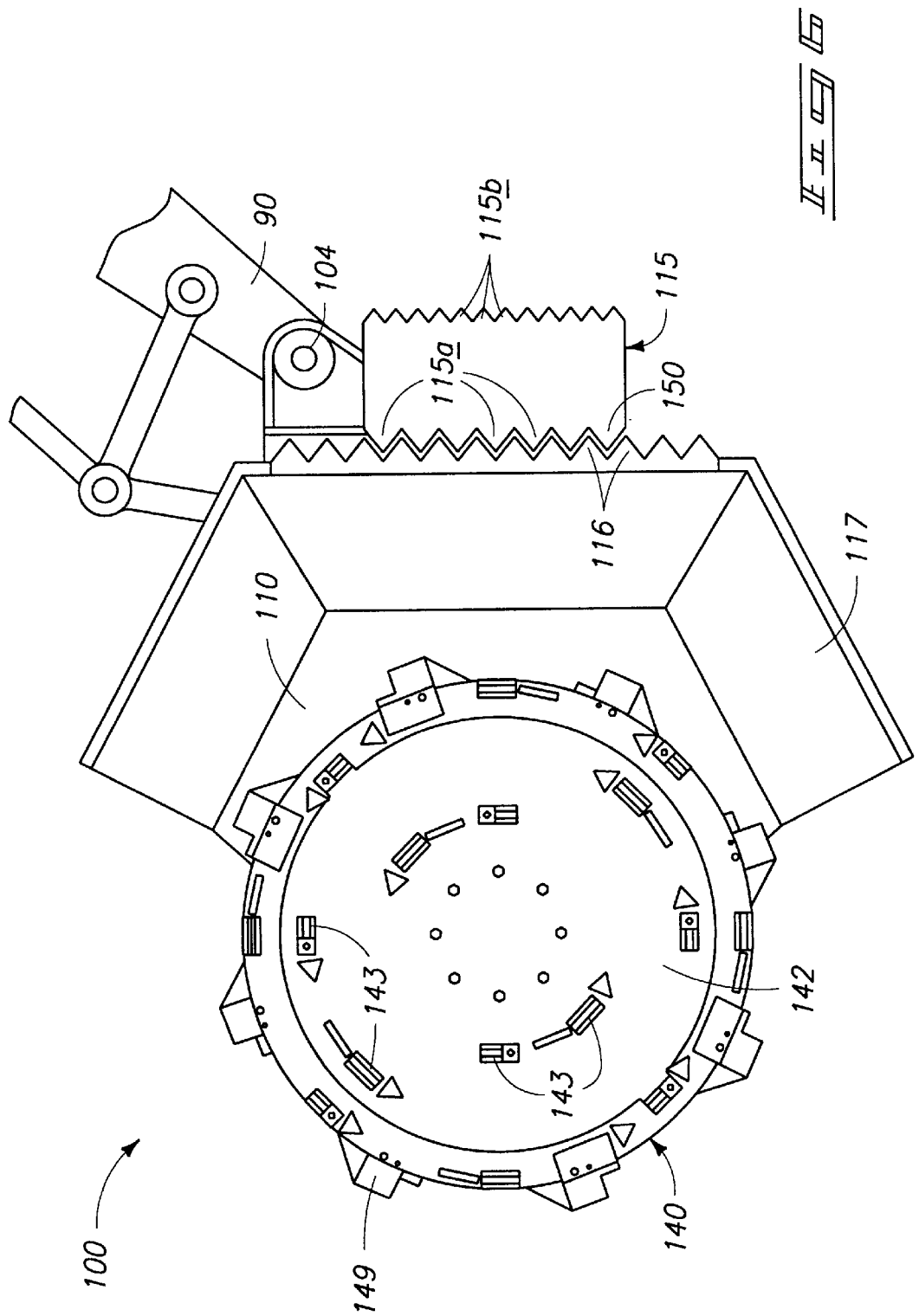
FIG. 6 is the cutting head of FIG. 2 with the cutting head swivelled opposite to FIG. 5.

Referring to FIGS. 2–8, a cutting head 100 is more thoroughly described. Referring to FIG. 2, cutting head 100 includes a cylindrical cutting head swivel, or hydraulic rotary actuator 107 oriented generally longitudinally parallel and beneath actuator mounting plate 105. A pair of clamps 106 secure hydraulic rotary actuator 107 to actuator mounting plate 105. Hydraulic rotary actuator 107 is rotationally connected to a cutting head frame 110 between a rearward end 108 and a forward end 109 of cutting head frame 110. Actuation of hydraulic rotary actuator 107 produces a selective swivel action of cutting head frame 110 about a swivel axis oriented along the longitudinal axis of hydraulic rotary actuator 107 and generally traversing the pivot axis of pivot point 104. Referring to FIG. 3, swivel action is generally indicated by arrow 144, and alternatively, arrow 145, both shown in phantom. FIG. 5 illustrates cutting head 100 swivelled according to arrow 144 and FIG. 6 illustrates cutting head 100 swivelled according to arrow 145.

Referring to FIGS. 2 and 4, rearward end 108 extends generally downwardly from hydraulic rotary actuator 107 and terminates into a lower end 111. A jaw 113 is pivotally connected to lower end 111 of rearward end 108 at a pivot point 112. Jaw 113 includes an extension plate 114 extending outwardly of pivot point 112 and terminates to form a serrated plate 115 oriented generally perpendicularly to extension plate 114. Serrated plate 115 extends forward of extension plate 114 and terminates to form a first set of teeth 115a, and extends rearward of extension plate 114 and terminates to form a second set of teeth 115b. The second set of teeth 115b act as a rake when pivoting actuator mounting plate 105 about pivot point 104 wherein the second set of teeth 115b pivot with cutting head frame 110 to provide a selective rake action across terrain 23. Extension plate 114 further defines a pivot point 126 spaced generally forward and below pivot point 112 and which provides a pivotal connection to a piston 125. Piston 125 slidingly extends from a hydraulic cylinder 123 pivotally connected to a bottom section 118 of cutting head frame 110.

A shroud 117 is mounted to the bottom section 118 of cutting head frame 110 and extends downwardly therefrom generally in front and below hydraulic cylinder 123. Shroud 117 defines a back section 120 extending toward serrated plate 115 wherein back section 120 terminates to form a third set of teeth 116 configured to engage in complementary fashion the second set of teeth 115b. Such engagement defines a first closed position of jaw 113. Particularly referring to FIG. 2, activation of hydraulic cylinder 123 selectively extends and retracts piston 125 to pivot jaw 113 about pivot point 112 between the first closed position (shown in solid lines), and alternatively, a second open position 122, shown in phantom. Accordingly, jaw 113 and third set of teeth 116 cooperate relative one another to provide a grasping action for debris and severed vegetation.

Referring to FIG. 2, a front section 127 of shroud 117 defines an open section to house a portion of a cutting disk 140. Cutting disk 140 is rotatably mounted to cutting head frame 110 below bottom section 118 at a forward end 109. A hydraulic motor 128 is secured to cutting head frame 110 above forward end 109 to drive cutting disk 140 rotationally. Hydraulic motor 128 is operatively connected to auxiliary engine 28 for power. It is preferred to devote all or substantially all of the power to the cutting wheel to provide substantially enhanced performance. It should be understood that in less preferred configurations the hydraulic rotary actuator 107 and hydraulic cylinder 123 could be powered by auxiliary engine 28, or primary engine 26, or combinations thereof.

The hydraulic system powering the cutter preferably is provided with an oil cooler for cooling the hydraulic drive. This can be a fan and radiator combination 337 (See FIG. 10). The hydraulic oil cooler is preferably in side-by-side relationship to the auxiliary engine coolant radiator 338. This configuration allows the hydraulic oil to be better cooled in view of the high power of the cutter drive.

Referring to FIGS. 3 and 5, cutting disk 140 defines an upper face 141 which includes a plurality of removably secured cutting and grinding devices 143 extending therefrom. Referring to FIGS. 3 and 6, cutting disk 140 defines a lower face 142 which includes a plurality of removably secured cutting teeth and/or grinding or comminuting devices or features 143 extending therefrom. Furthermore, some of such cutting and grinding devices 143 extend outwardly of a periphery 148 of cutting disk 140 to define a periphereal cutting area.

Cutter Drive

Figure 7:
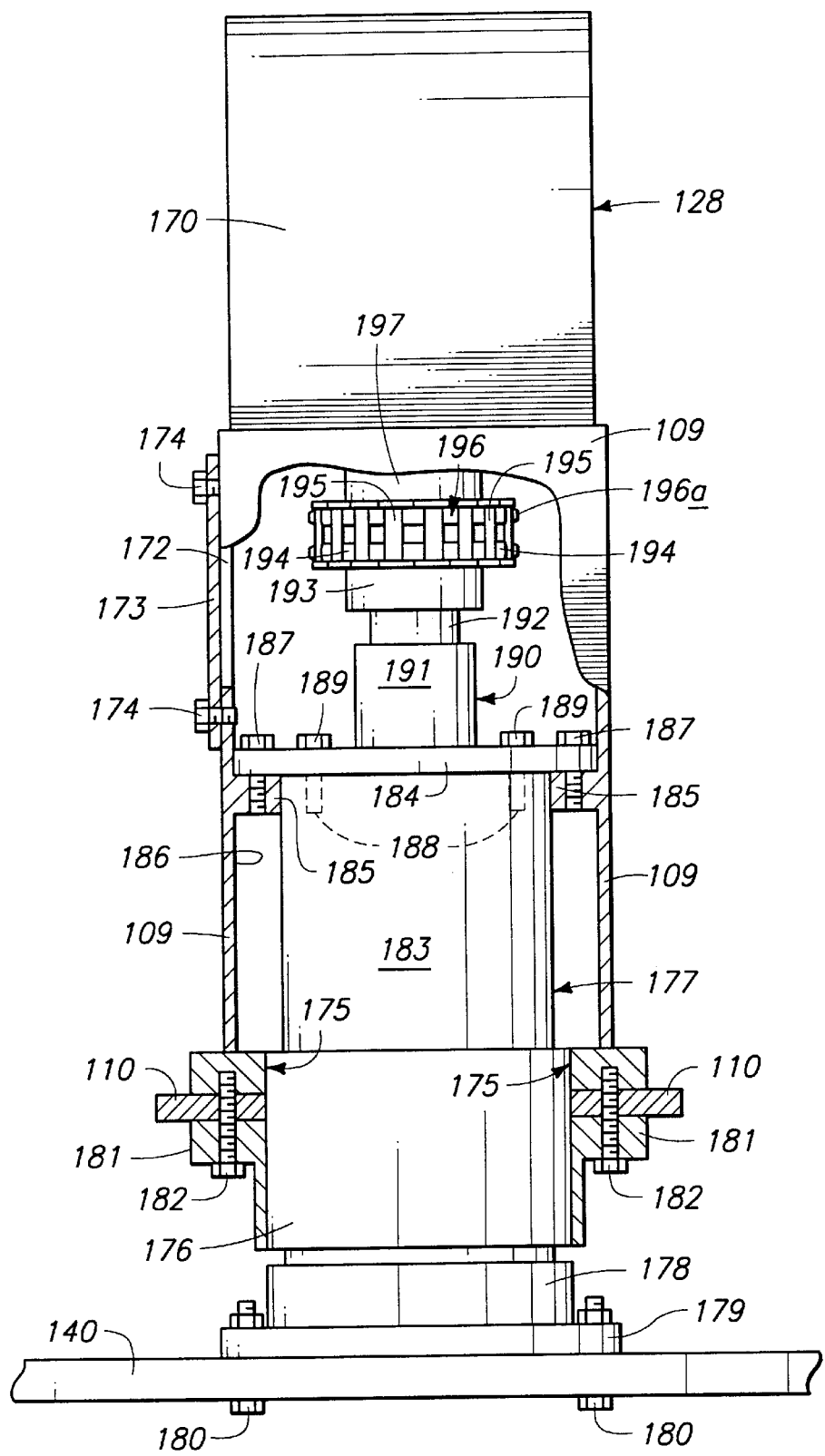
FIG. 7 is a partial front view of the cutting head of FIG. 2 shown partially in cross-section taken substantially along line 7—7 in FIG. 2.
Figure 8:
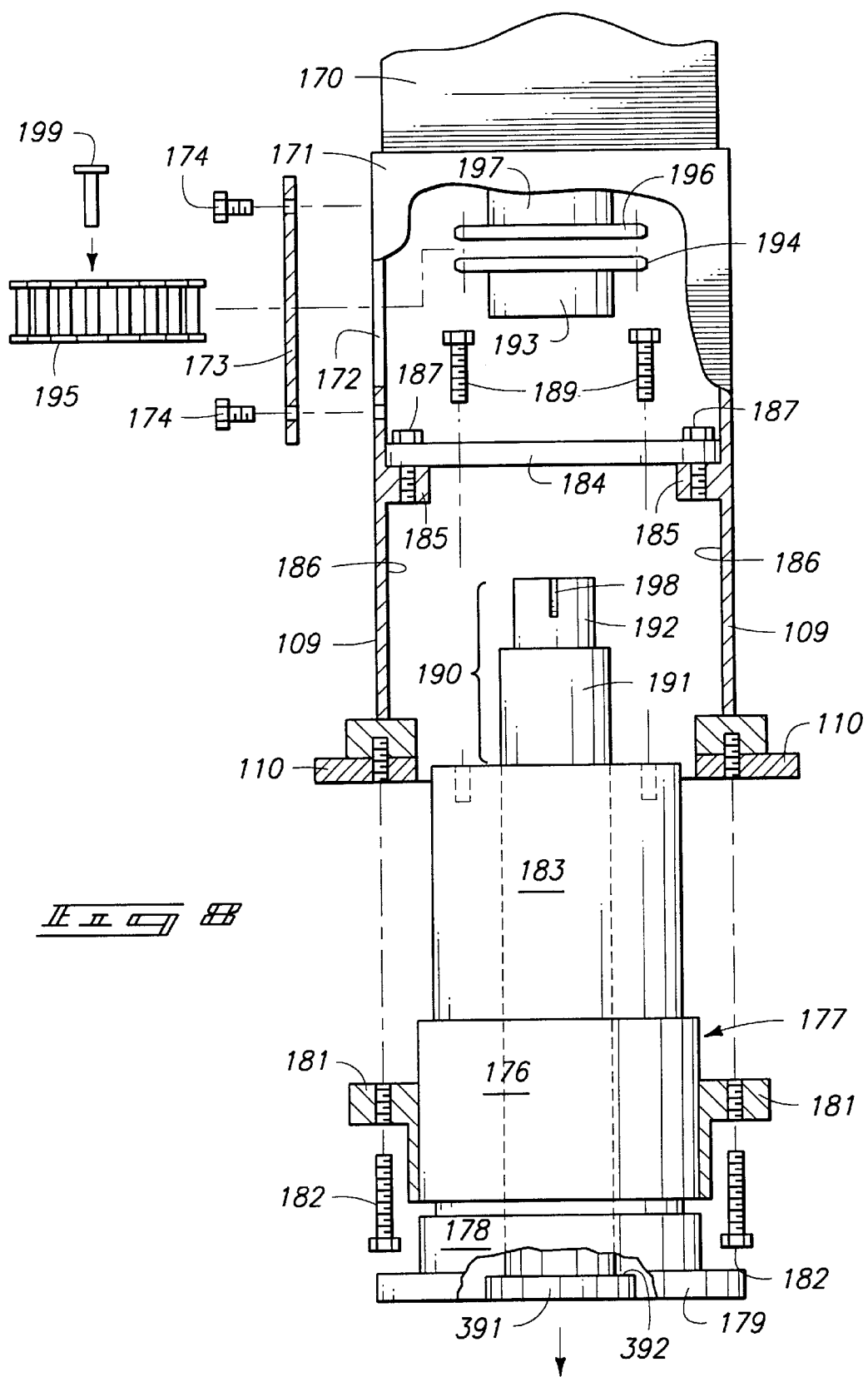
FIG. 8 is an exploded view of portions of the FIG. 7 cutting head with components of the cutting head shown removed.

Referring to FIGS. 7 and 8, cutting disk 140 and components that drive same are described more thoroughly. Beginning at the bottom of FIG. 7, a fragmented view of cutting disk 140 is illustrated with cutting and grinding devices 143 removed. Cutting disk 140 is secured to a hub 178 by threaded members 180 extending through cutting disk 140 and a laterally extending flange region 179 of hub 178. Hub 178 is rotatably secured to forward end 109 of cutting head frame 110 by a bearing mechanism, or main bearing (detailed components not illustrated) housed inside the forward end 109 of cutting head frame 110. Actual components of main bearing are not shown nor described as such is understood and conventional in the art. However, a main bearing housing, or cartridge 177 for enclosing the main bearing is illustrated.

Cutter Drive Cartridge

Cartridge 177 includes a first portion 176 which extends through an opening 175 in cutting head frame 110. Flanges 181 extend laterally outwardly from first portion 176 and are positioned adjacent to cutting head frame 110 such that threaded members 182 extend through flanges 181 into cutting head frame 110 to secure cartridge 177 to cutting head frame 110. A second portion 183 of cartridge 177 extends upwardly from the first portion 176 and defines a smaller cross-sectional dimension than the first portion 176 and is completely housed in the forward end 109 of cutting head frame 110.

An upper end of second portion 183 abuts against a mating plate 184 and is secured thereto by threaded members 189 extending through mating plate 184 into aligned bores 188 formed in second portion 183. The cross-sectional dimension of mating plate 184 is larger than the cross-sectional dimension of second portion 183 to extend outwardly of opposite sides of second portion 183 and rest on shoulders 185 extending inwardly from an inner wall 186 of cutting head frame 110. Threaded members 187 secure mating plate 184 to shoulders 185.

A drive shaft, or first shaft 190 includes a first portion 191 that is secured to hub 178. As shown, shaft 191 has a boss or flange 391 at the distal end which mates with a stepped receptacle 392 formed in part 179 and extends from cartridge 177 through mating plate 184. A second portion 192 of first shaft 190 extends upwardly from first portion 191 and into a first sprocket 193. First sprocket 193 defines sprocket teeth 194 extending radially outwardly to receive a portion of a drive chain 195. Spaced above and aligned with first sprocket 193 is a second sprocket 196 defining sprocket teeth 196a extending radially outwardly to receive another portion of drive chain 195 wherein first sprocket 193 is coupled to second sprocket 196. Sprocket teeth 196a of second sprocket 196 are formed on a terminal end of a hydraulic motor shaft 197 wherein hydraulic motor shaft 197 is driven rotationally by hydraulic motor 128 as is understood in the industry, and therefore, is not described.

Cutter Drive Connection

It should be understood that second portion 192 of first shaft 190 is keyed into first sprocket 193 as understood in the art, and FIG. 8 illustrates an exemplary key opening 198, such as a longitudinal slot, in second portion 192 of first shaft 190 to receive a key extension, or nodule (not shown) formed on an inside wall of first sprocket 193. Such key configuration will allow first shaft 190 to be released downward from first sprocket 193 without removing drive chain 195 to uncouple first and second sprockets 193 and 196.

A portion of forward end 109 defines an opening 172 for access to drive chain 195 and threaded members 189. A door or cover 173 is secured to forward end 109 of cutting head frame 110 by threaded members 174 to protect the inside of forward end 109 from the outside environment.

Cartridge Changing

Referring to FIG. 8, an exemplary method of removing cartridge 177, first shaft 190 and hub 178 as a unit is illustrated. It should be understood that cutting disk 140 has already been removed from hub 178 by removing threaded members 180 (see FIG. 8). It should further be understood cutting disk 140 can be removed at any stage of the exemplary sequence of steps described subsequently. Alternatively, cutting disk 140 could remain secured to hub 178 and be removed with the unit. First, threaded members 174 are removed so door 173 can be separated from cutting head frame 110 to provide access to opening 172.

One exemplary method includes removing threaded members 189 from threaded bores 188 to release second portion 183 of cartridge 177 from mating plate 184. Next, in one exemplary method, threaded members 182 can be removed from flanges 181 of first portion 176 and cutting head frame 110 to release first portion 176 from cutting head frame 110 allowing cartridge 177, first shaft 190 and hub 178 to be unleashed as a unit from forward end 109 of cutting head frame 110. It should be understood that this is only one exemplary method of removing the unit and that any combination of these steps could be performed in any order.

Alternatively, first portion 176 of cartridge 177 could be released from the cutting head frame 110 before removing door 173.

Furthermore, second portion 192 of first shaft 190 could define another key configuration such that first shaft 190 cannot be released from first sprocket 193 by simply applying a downward force on the unit, and therefore, drive chain 195 may need to be removed to unleash first sprocket 193 with the unit. If so, it should be understood that drive chain 195 is released from first and second sprockets 193 and 196 by removing a master link 199 as is understood in the art. Moreover, drive chain 195 could be removed before or after threaded members 189 are released from second portion 183 and mating plate 184. It should be understood that any combination of these steps could be performed in any suitable order to effect the indicated disconnection.

Auxiliary Engine

Figure 9:
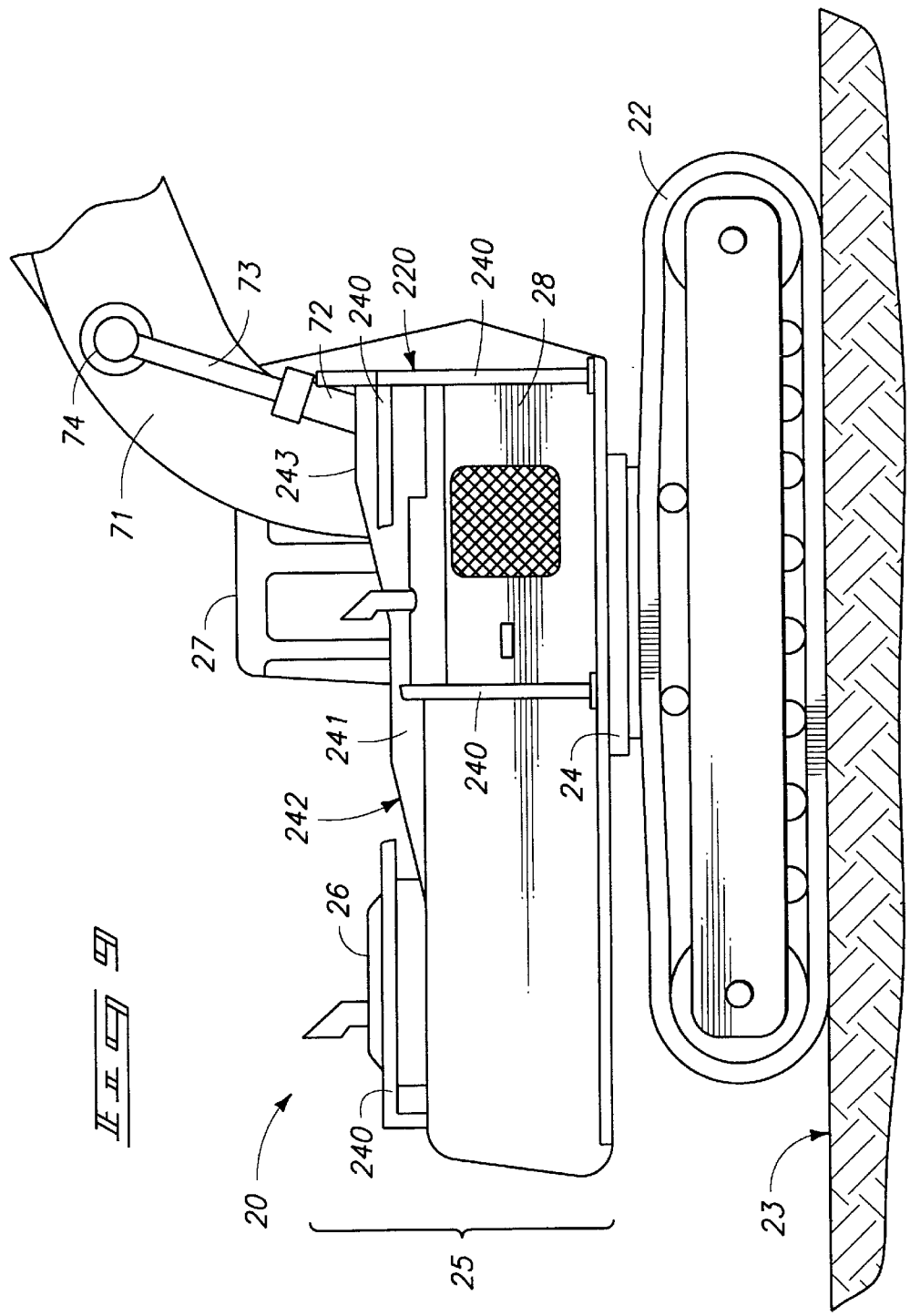
FIG. 9 is a partial side view of FIG. 1 more particularly pointing out and illustrating an auxiliary engine according to a preferred form of the present invention.

Referring to FIG. 9, a larger fragmented view of FIG. 1 is shown to facilitate a more thorough description of auxiliary engine 28. A steel frame 240 surrounds auxiliary engine 28 and is partially broken away to more thoroughly show components of engine 28. An upper cover, or top steel cover 241 protects an upper portion of auxiliary engine 28. Upper cover 241 defines an upper surface 242 which has alternating angled and generally horizontal portions relative to terrain 23 to establish steps which increase in elevation as upper cover 241 extends from the rear of turret 25 toward the front. It should be understood that the upper surface 242 of upper cover 241 may comprise configurations other than the stepped configuration shown, such as, a generally horizontal upper surface relative terrain 23.

Figure 11:
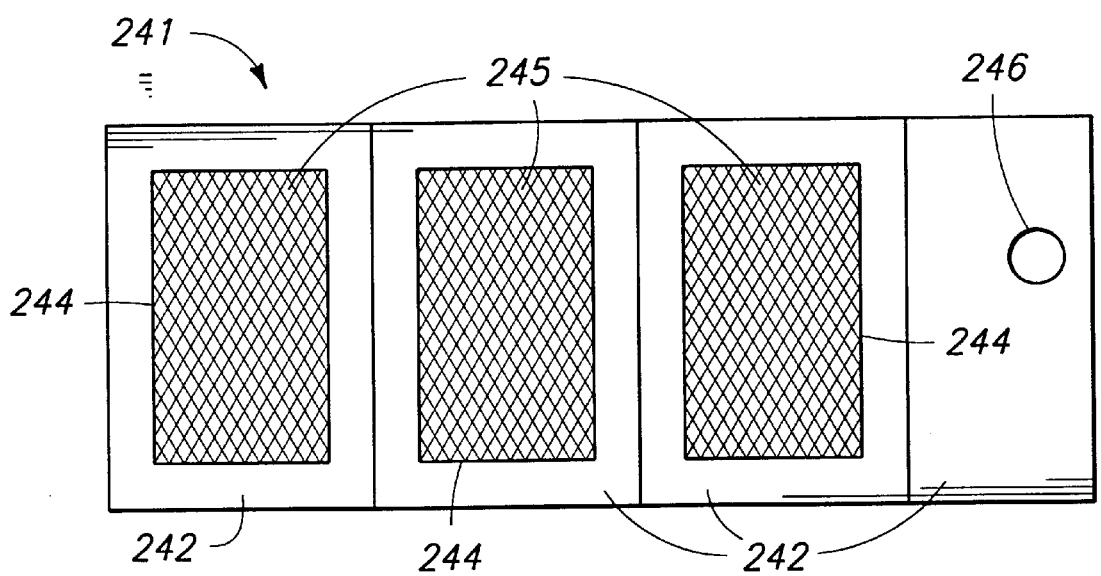
FIG. 11 is a top view of an upper cover for the auxiliary engine in isolation.

An exemplary upper cover 241 includes a front portion 243 pivotally connected to frame 240 (not shown) to allow upper cover 241 to be pivoted upward when access to upper portion of auxiliary engine 28 is warranted. Referring to FIG. 11, the upper surface 242 of top cover 241 is more thoroughly shown defining a plurality of square openings 244 with each covered by a screen 245 to allow dissipation of heat from auxiliary engine 28 and viewing therein. Also shown is a circular opening 246 which may be used, for access to the radiator cap (not shown).

Figure 10:
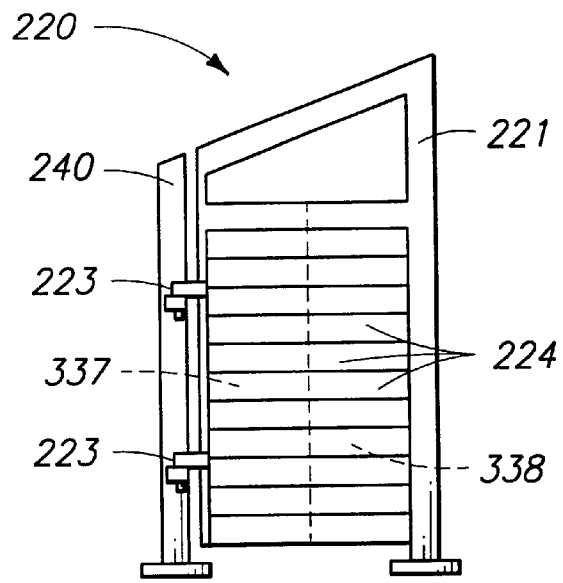
FIG. 10 is a front elevational view of a front cover for the auxiliary engine in isolation.

Referring to FIG. 9, a front cover, or louver 220 is generally indicated at a front portion of auxiliary engine 28, and referring to FIG. 10, louver 220 is shown in detail. Louver 220 is attached to frame 240 by a plurality of hinges 223. Louver 220 comprises a steel frame 221 with fins 224 extending generally horizontally between portions of frame 221. Fins 224 are slanted downward to provide ventilation, and to exclude rain and other debris from reaching auxiliary engine 28 from the front.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect.

I claim:

1. A self-powered implement for clearing land by comminuting and grinding brush and trees at an operational site in the field to clear the land by leaving the comminuted brush and trees at the operational site, comprising:

a self-propelled vehicle;

a primary engine mounted upon the self-propelled vehicle for powering the self-propelled vehicle overland;

at least one boom mounted upon the vehicle; said boom being constructed to provide articulated motion at a distal end thereof; said boom being powered by said primary engine;

an operational head mounted near the distal end of said at least one boom; said head being capable of swivel action from side-to-side and tilting action front-to-back to facilitate following contours of land being cleared;

said head having a comminuting device mounted thereon for movement to grind or comminute trees and brush;

a comminuting motor mounted upon said head to move said comminuting device;

a secondary engine mounted upon the self-propelled vehicle for powering the comminuting motor to provide dedicated power to the comminuting device.

2. An implement according to claim 1 wherein the comminuting motor is a hydraulic motor.

3. An implement according to claim 1 wherein the comminuting motor is a hydraulic motor, and further comprising a hydraulic fluid cooling system to cool hydraulic fluid used to power said hydraulic motor serving as said comminuting motor.

4. An implement according to claim 1 wherein the self-propelled vehicle includes a turret that rotates and the at least one boom is mounted upon the turret for rotation therewith.

5. An implement according to wherein:

the self-propelled vehicle includes a turret that rotates;

the at least one boom is mounted upon the turret for rotation therewith;

the primary and secondary engines are mounted upon the turret.

6. A self-powered implement for clearing land by comminuting and grinding brush and trees at an operational site in the field to clear the land by leaving the comminuted brush and trees at the operational site, comprising:

a self-propelled vehicle having ground engaging tracks for contact with the ground to provide overland movement;

a primary engine mounted upon the self-propelled vehicle for powering the self-propelled vehicle overland;

a turret mounted upon the self-propelled vehicle for rotation thereon;

at least one boom mounted upon the turret for rotation therewith; said boom being constructed to provide articulated motion at a distal end thereof; said boom being powered by said primary engine;

an operational head mounted near the distal end of said at least one boom; said head being capable of swivel action from side-to-side and tilting action front-to-back to facilitate following contours of land being cleared;

said head having a comminuting device mounted thereon for movement to grind or comminute trees and brush;

a comminuting hydraulic motor mounted upon said head to move said comminuting device;

a secondary engine mounted upon the self-propelled vehicle for powering the comminuting motor to provide dedicated power to the comminuting device;

a hydraulic fluid cooler mounted to cool hydraulic fluiid used to power the comminuting motor.

7. An implement according to claim 1 wherein the primary and secondary engines are mounted upon the turret.

* * * * *

UNITED STATES PATENT AND TRADEMARK OFFICE
CERTIFICATE OF CORRECTION

PATENT NO.   : 6,668,880 B2
DATED        : December 30, 2003
INVENTOR(S)  : C. Richard Nordstrom It is certified that error appears in the above-identified patent and that said Letters Patent is hereby corrected as shown below:

Column 8,
Line 17, after "according to", insert -- claim 1, --.
Line 53, delete "fluiid" and insert -- fluid --.

Signed and Sealed this

Twenty-first Day of December, 2004

JON W. DUDAS
*Director of the United States Patent and Trademark Office*